US012704233B2

(12) United States Patent
Schimon

(10) Patent No.: US 12,704,233 B2
(45) Date of Patent: Aug. 11, 2026

(54) LIGHTING DEVICE FOR A MOTOR VEHICLE WITH LENS HOLDER

(71) Applicant: HELLA GMBH & CO. KGAA, Lippstadt (DE)

(72) Inventor: Christian Schimon, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/072,316

(22) Filed: Mar. 6, 2025

(65) Prior Publication Data

US 2025/0290612 A1 Sep. 18, 2025

(30) Foreign Application Priority Data

Mar. 18, 2024 (DE) ........................ 102024107654.2

(51) Int. Cl.

| | |
|---|---|
| ***F21S 41/29*** | (2018.01) |
| ***F21S 41/141*** | (2018.01) |
| ***F21S 41/143*** | (2018.01) |
| ***F21S 41/20*** | (2018.01) |
| ***F21S 41/255*** | (2018.01) |
| ***F21S 41/47*** | (2018.01) |

(Continued)

(52) U.S. Cl.

CPC ........... *F21S 41/295* (2018.01); *F21S 41/141* (2018.01); *F21S 41/143* (2018.01); *F21S 41/255* (2018.01); *F21S 41/285* (2018.01); *F21S 41/47* (2018.01); *F21S 45/48* (2018.01); *F21Y 2115/10* (2016.08)

(58) Field of Classification Search

CPC ...... F21S 41/255; F21S 41/295; F21S 41/285; F21S 41/47; F21S 41/153

See application file for complete search history.

(56) References Cited

U.S. PATENT DOCUMENTS

2014/0029287 A1* 1/2014 Anzai ................ G02B 19/0047 362/521

2016/0097504 A1* 4/2016 Abe ...................... F21S 41/255 362/509

2019/0086051 A1* 3/2019 Motohashi ............ F21S 41/153

(Continued)

FOREIGN PATENT DOCUMENTS

| | | | |
|---|---|---|---|
| JP | 2017040901 | A | 2/2017 |
| JP | 2018014285 | A | 1/2018 |
| JP | 2022021627 | A | 2/2022 |

*Primary Examiner* — Tracie Y Green

*Assistant Examiner* — Michael Chiang

(74) *Attorney, Agent, or Firm* — WARNER NORCROSS + JUDD LLP

(57) ABSTRACT

The invention relates to a lighting device for a motor vehicle. The lighting device includes an imaging component having an active surface on which light-emitting diodes or laser diodes are arranged in a matrix-like manner for the targeted generation of pixels of a light distribution. The lighting device also includes projection optics. The projection optics are configured to project the light emanating from the active surface to the exterior of the motor vehicle during operation of the lighting device. The projection optics includes at least a first lens, a second lens, and a third lens. The lighting device also includes a lens holder, wherein the lens holder is suitable and configured to hold at least the third lens. The lighting device also includes a holding means, wherein the holding means is suitable and configured to hold the first lens and the second lens.

10 Claims, 4 Drawing Sheets

(51) Int. Cl.

| | |
|---|---|
| ***F21S 45/48*** | (2018.01) |
| *F21Y 115/10* | (2016.01) |

(56) References Cited

U.S. PATENT DOCUMENTS

| | | | | |
|---|---|---|---|---|
| 2023/0097767 | A1* | 3/2023 | Sato | G02B 19/0066 362/539 |
| 2024/0052988 | A1* | 2/2024 | Mochizuki | F21S 41/295 |
| 2024/0344680 | A1* | 10/2024 | Yang | F21S 41/29 |

* cited by examiner

LIGHTING DEVICE FOR A MOTOR VEHICLE WITH LENS HOLDER

CROSS-REFERENCE TO RELATED APPLICATIONS

The present application claims the benefit of German Patent Application No. 10-2024-107-654.2, filed Mar. 18, 2024, the disclosure of which is incorporated by reference.

FIELD OF THE INVENTION

The present invention relates to a lighting device for a motor vehicle, in particular a high-resolution headlamp, comprising an imaging component having an active surface on which light-emitting diodes or laser diodes are arranged in a matrix-like manner for the targeted generation of pixels of a light distribution, a projection optics, the projection optics being suitable and configured to project the light emanating from the active surface toward the exterior of the motor vehicle during operation of the lighting device, the projection optics comprising at least a first, a second, and a third lens, wherein the light emitted from the active surface first passes through the third lens, then through the second lens, and then through the first lens, and a lens holder, the lens holder being suitable and configured to hold at least the third lens, and a motor vehicle having such a lighting device.

BACKGROUND OF THE INVENTION

Lighting devices are known from the prior art. In the known lighting devices, the lens holder is usually not only suitable and configured to hold the third lens, but also holds the first lens and the second lens. This is only possible without problems if the size of the lenses is in descending order, i.e. the first lens is the largest lens, the second lens is of medium size and the third lens is the smallest lens. This requirement cannot always be met, both in terms of construction and design.

SUMMARY OF THE INVENTION

It is an object of the present invention to propose a lighting device in which there is an improved fastening option for the lenses. The object is achieved by a lighting device for a motor vehicle, in particular a high-resolution headlamp, comprising at least:

- an imaging component having an active surface on which light-emitting diodes or laser diodes are arranged in a matrix-like manner for the targeted generation of pixels of a light distribution,
- projection optics, the projection optics being suitable and configured to project the light emanating from the active surface toward the exterior of the motor vehicle during operation of the lighting device, the projection optics comprising at least a first lens, a second lens, and a third lens, wherein the light emanating from the active surface first passes through the third lens, then through the second lens and then through the first lens,
- a lens holder, the lens holder being suitable and configured to hold at least the third lens, wherein the lighting device comprises a holding means, the holding means being suitable and configured to hold the first lens and the second lens.

The holding means is suitable for holding different lens geometries. Depending on the lens, the first lens and the second lens can be fastened to the holding means in different manners. Conceivable options here include screw connections, clamp connections, snap-in connections, adhesive connections, welded or laser-welded connections. The holding means can be designed such that it is adapted to the first lens and to the second lens. This has the advantage that the lenses can be selected independently of the holding means. In particular, the first lens is often visible in lighting means and is therefore also selected according to optical aspects in terms of shape and size. The proposed holding means offers the advantage that the shape and size of the first and second lenses are not limited by the fastening within the lighting device.

It may be provided that the imaging component is a solid-state LED array, in particular an SSL HD module.

Further, it may be provided that the holding means is designed in one piece and/or in the shape of a cup. The holding means can have a hole in the middle which allows the light emitted by the active surface to pass through.

It is possible for the holding means to be arranged between the first lens and the second lens. An arrangement of the holding means between the first and the second lens offers the advantage that the first lens can be held on the side of the holding means facing away from the imaging component and the second lens can be held on the side of the holding means facing the imaging component. In particular, it may be provided here that the second lens can be arranged within the cup-shaped holding means. The holding of the first lens and the second lens on different sides of the holding means offers the possibility of designing the holding for the respective lens on the holding means without design restrictions.

Further, it is possible for the holding means to have first elements, preferably first recesses, for fastening the first lens on the side facing away from the imaging component and second elements, preferably second recesses, for fastening the second lens on the side facing the imaging component. The first elements and the second elements can be shaped in such a manner that a clamping, latching, plug-in, screw or welded connection is possible. The desired type of connection is primarily determined by the lenses used. The first element and the second element of the holding means can be adapted to the lenses.

Preferably, it can be provided that the holding means is designed as an aperture diaphragm, wherein the aperture diaphragm is suitable and configured to limit the light projected by the projection optics into the exterior of the motor vehicle. In addition to the aforementioned advantages offered by the holding means, since it is suitable and configured to hold the first lens and the second lens, a further advantage is that the holding means can be designed as an aperture diaphragm. This enables the functional integration of different tasks into the holding device. This means that fewer components are required within the lighting device, thereby reducing costs and assembly times. It is advantageous if the holding means is designed as an aperture diaphragm in order to achieve the desired light distribution. The structural design of the lighting device creates corners or edges within the lighting device at which the light emanating from the active surface can be refracted or reflected. This can result in the light image that is reproduced in an exterior of the lighting device being faulty. The aperture diaphragm ensures that only the light required for the desired light distribution is projected into the exterior of the lighting device.

It may be provided that the third lens is suitable and configured to produce light with an approximately parallel beam path, wherein the third lens is preferably designed as a collimator.

It may be provided that the holding means has positioning elements for fastening a diaphragm. A diaphragm can be placed in front of the first lens to provide a visually appealing external appearance to an observer of the lighting device. The lighting device is used when installed in a motor vehicle, which is also designed overall with visual aspects in mind. It is therefore required that the lighting device can also be designed according to visual aspects. Furthermore, a diaphragm can be used to prevent an observer from seeing the technical inner workings of the lighting device. This requires the gap between the diaphragm and the first lens to be as small as possible. The positioning elements help to ensure that the diaphragm can be fitted precisely to the holding means and that the gap between the diaphragm and the first lens is minimized.

Further, it may be provided that a heat sink is arranged on the imaging component. A heat sink is required to dissipate the heat generated by the imaging component.

It is possible for the holding means to be designed as a plastic injection-molded part, preferably made of a thermoset or thermoplastic. Thermosets and thermoplastics offer different advantages in use. The advantage of using thermosets for the holding means is that the holding means is resistant to deformation and exhibits little expansion over the entire temperature range. Deformation or expansion is not desirable, as this would lead to a change in the position of the lenses within the lighting device. In turn, a change in the position of each individual lens can result in the light distribution to be produced being reproduced differently than desired on the area around the motor vehicle, for example on the road surface.

The motor vehicle comprises at least one lighting device according to the invention.

BRIEF DESCRIPTION OF THE DRAWINGS

Further features and advantages of exemplary embodiments of the invention are described below with reference to the drawings. The same reference signs are used for identical or similar parts and for parts with identical or similar functions. In the figures.

DETAILED DESCRIPTION OF THE CURRENT EMBODIMENTS

Figure 1:
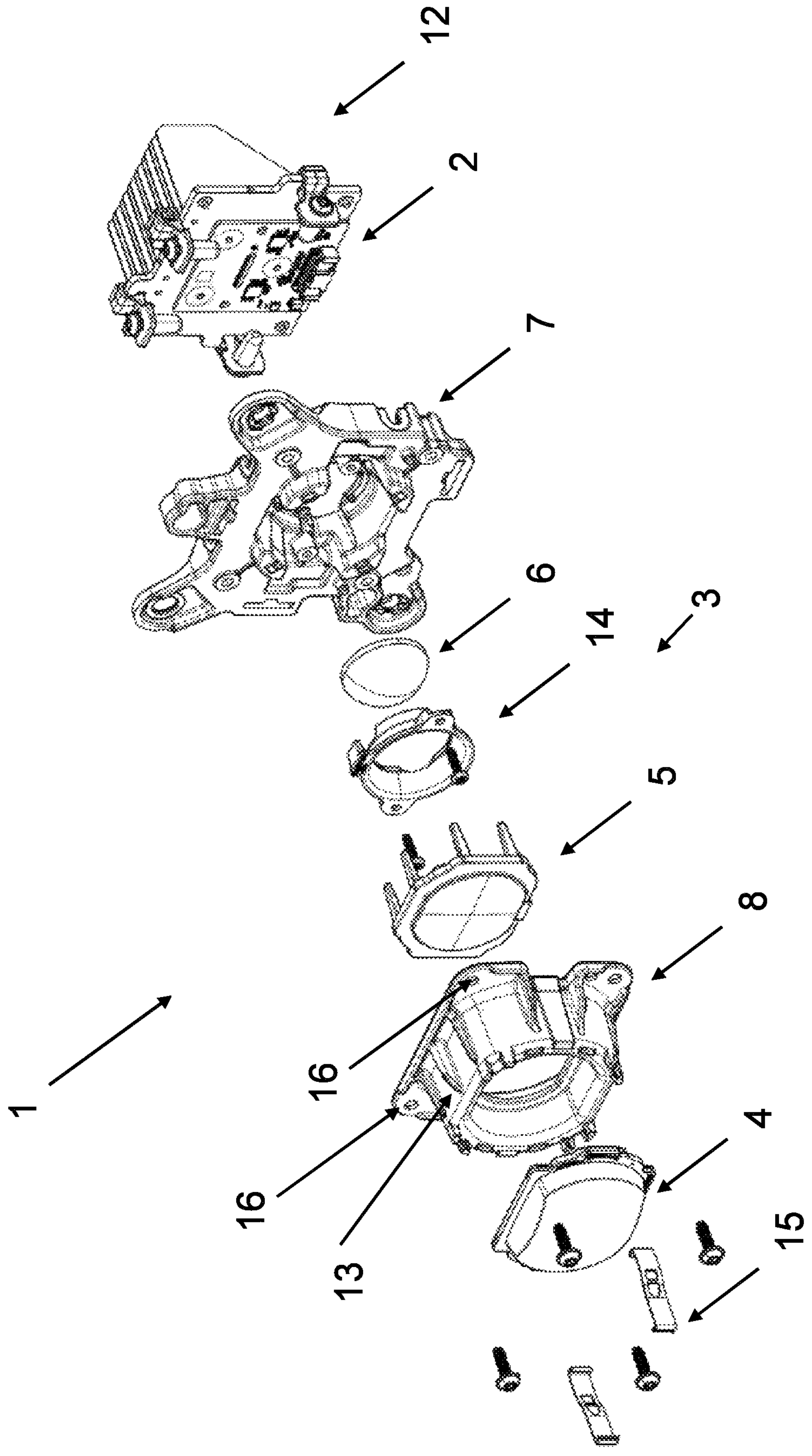
FIG. 1 is an exploded view of a lighting device according to the invention.

FIG. 1 is an exploded view of a lighting device 1 according to the invention.

Lighting device 1 comprises an imaging component 2 having an active surface, a projection optics 3, a lens holder 7, a holding means 8 and a heat sink 12.

Light-emitting diodes or laser diodes are arranged in a matrix-like manner on the active surface of the imaging component 2 for the targeted generation of pixels of a light distribution. Projection optics 3 is suitable and configured to project the light emanating from the active surface into the exterior of the motor vehicle when the lighting device 1 is in operation. Projection optics 3 comprises a first lens 4, a second lens 5, and a third lens 6, wherein the light emanating from the active surface first passes through the third lens 6, then through the second lens 5, and then through the first lens 4.

The third lens 6 is attached to the lens holder 7. The third lens 6 is fastened to the lens holder 7 via a fastening means 14.

The holding means 8 is suitable and configured to hold the first lens 4 and the second lens 5. The holding means 8 is designed in one piece and in the shape of a cup and is arranged between the first and second lenses 4, 5.

The heat sink 12 is arranged on the imaging component 2 in order to dissipate the heat from the imaging component 2.

FIG. 1 shows the structure of the lighting device 1. The imaging component 2 is arranged on the heat sink 12. This is followed by the lens holder 7, which holds the third lens 6, which is fastened to the lens holder 7 via the fastening means 14.

The second lens 5 can be fastened to the holding means 8, which is arranged between the first and second lenses 4, 5. In FIG. 1, the first lens 4 forms the end of the lighting device 1. A diaphragm is not shown in FIG. 1.

Figure 2:
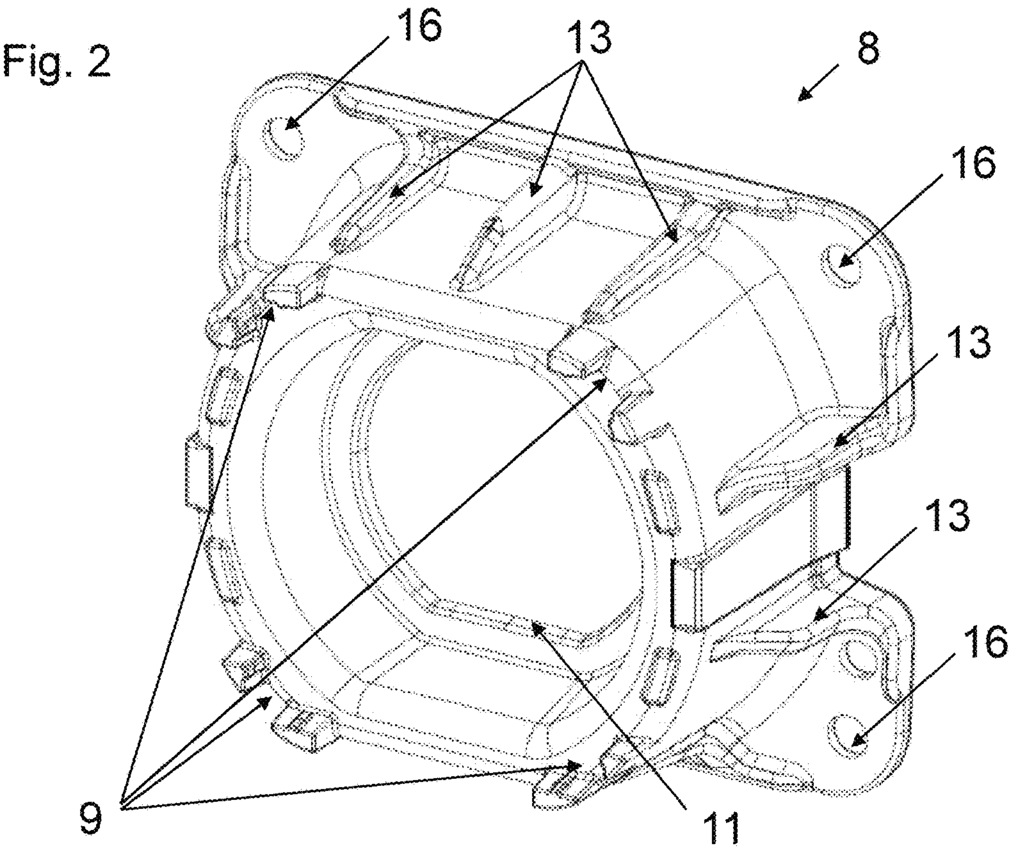
FIG. 2 is a perspective view of the holding means from the side facing away from the imaging component.
Figure 3:
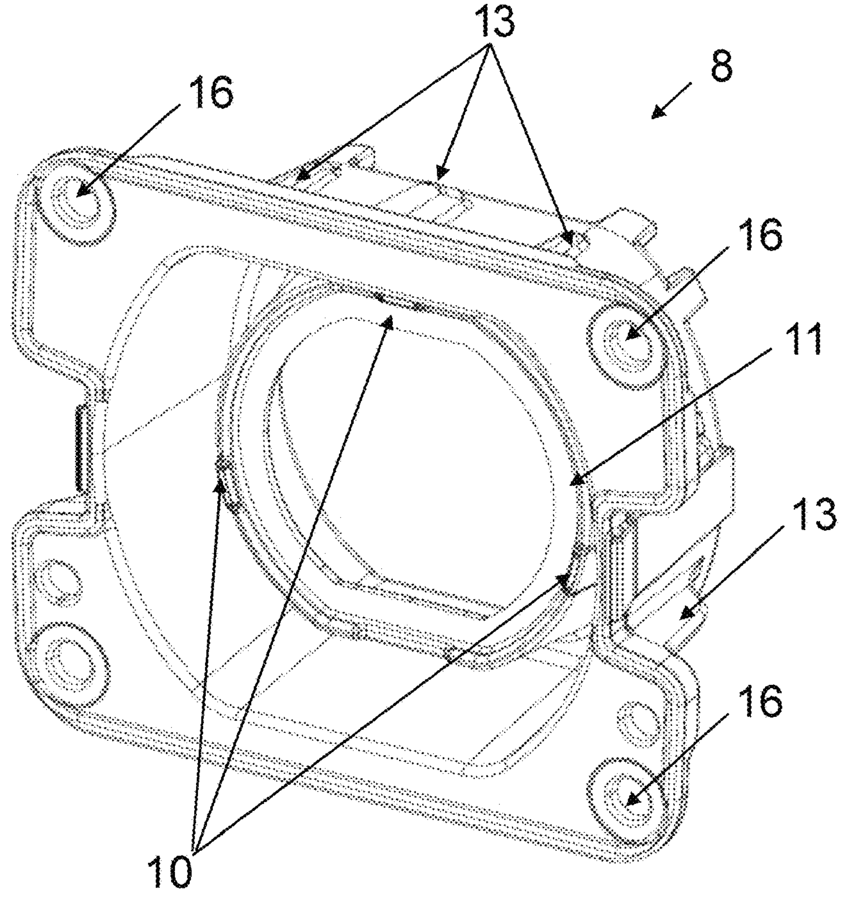
FIG. 3 is a perspective view of the holding means from the side facing the imaging component.
Figure 4:
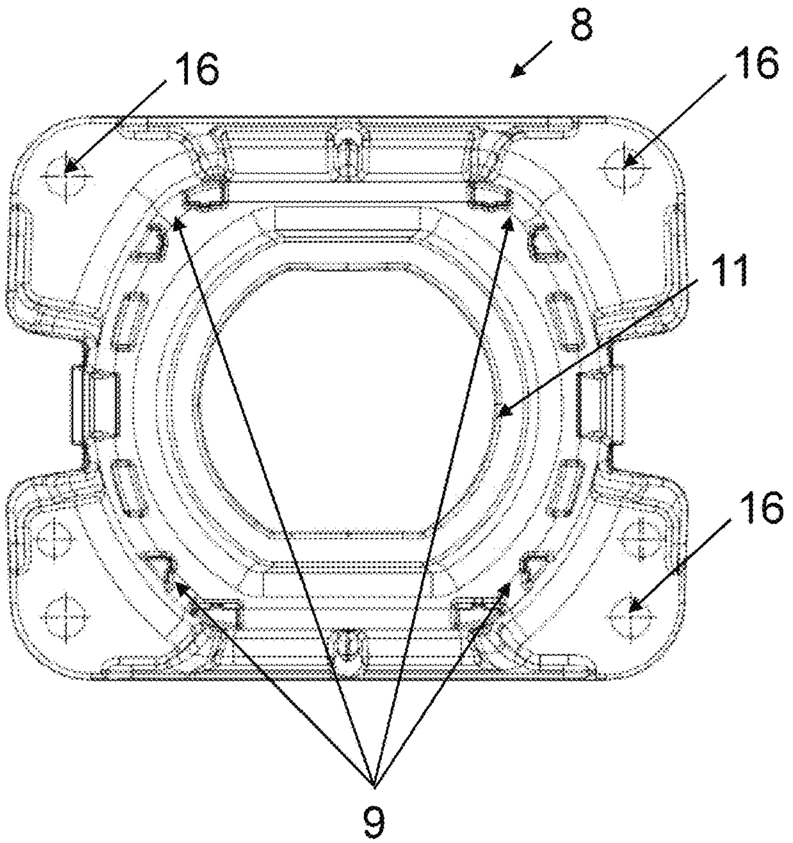
FIG. 4 is a view of the holding means from the side facing away from the imaging component.

FIGS. 2 to 6 show the holding means 8 from different positions. FIGS. 2 and 4 show a view of the holding means 8 from the side facing away from the imaging component 2. In particular, the first elements 9 for fastening the first lens 4 and the positioning elements 13 for fastening a diaphragm not shown in detail can be seen in FIGS. 2 and 4. The first elements 9 are designed as recesses into which corresponding filling elements of the first lens 4 can be inserted. The first lens 4 can be locked to the holding means 8 using the spring elements 15 shown in FIG. 1.

Figure 5:
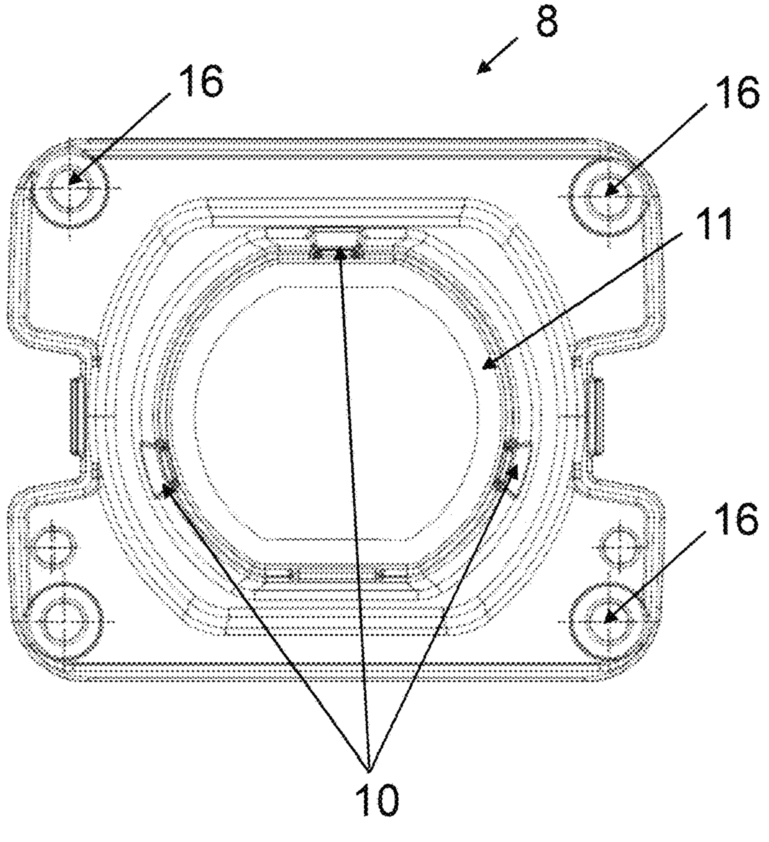
FIG. 5 is a view of the holding means from the side facing the imaging component.

FIGS. 3 and 5 show a view of the holding means 8 from the side facing the imaging component 2. In particular, the second elements 10 for attaching the second lens 5 can be seen in FIGS. 3 and 5. The second elements 10 are designed as recesses into which corresponding filling elements of the second lens 5 can be inserted.

Figure 6:
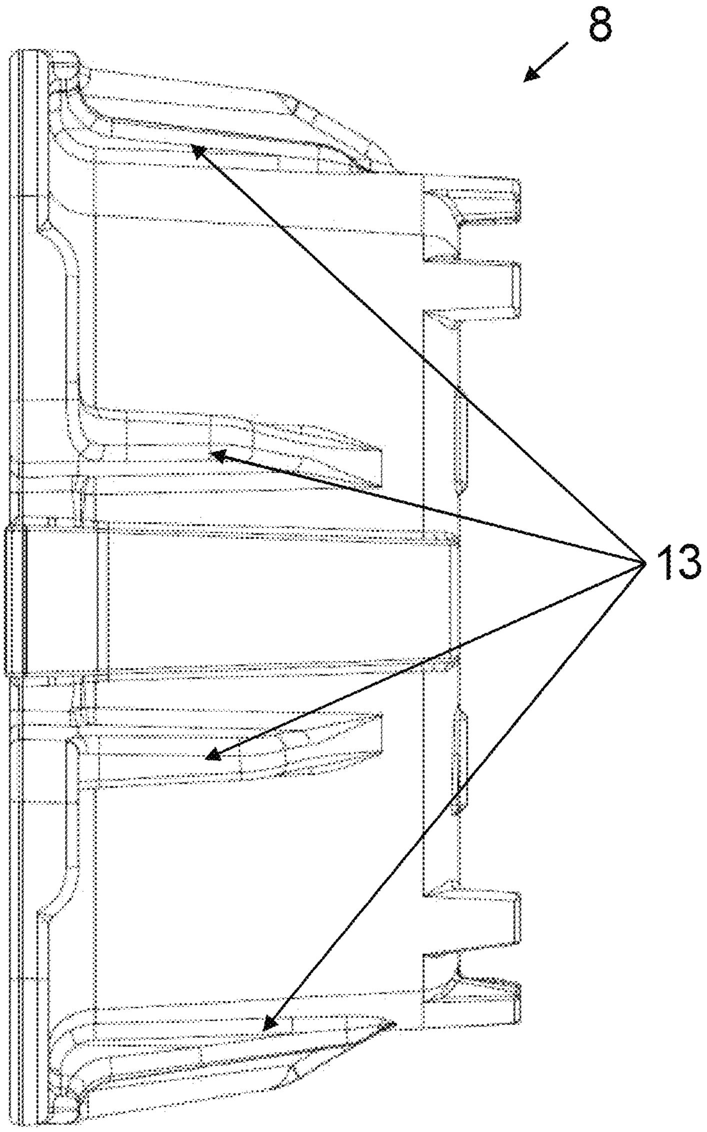
FIG. 6 is a side view of the holding means.

FIG. 6 shows the positioning elements 13, with which a diaphragm not shown in detail can be fastened to the holding means 8.

FIGS. 2 to 5 show holes 16 on projections of the cup-shaped holding means 8, with which the holding means 8 can be fastened, for example screwed, to the lens holder 7. It can also be seen in FIGS. 2 to 5 that the holding means 8 is designed as an aperture diaphragm 11, the aperture diaphragm 11 being suitable and configured to limit the light projected by the projection optics 3 into the exterior of the motor vehicle.

LIST OF REFERENCE NUMERALS

1 lighting device
2 imaging component
3 projection optics
4 first lens
5 second lens
6 third lens
7 lens holder
8 holding means
9 first elements
10 second elements

11 aperture diaphragm
12 heat sink
13 positioning elements
14 fastening means
15 spring elements
16 holes The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lighting device for a motor vehicle, the lighting device comprising:

an imaging component having an active surface on which light-emitting diodes or laser diodes are arranged in a matrix for a targeted generation of pixels of a light distribution;

projection optics, the projection optics being configured to project light emanating from the active surface toward an exterior of the motor vehicle, the projection optics comprising a first lens, a second lens, and a third lens, wherein the light emanating from the active surface first passes through the third lens, then through the second lens, and then through the first lens; and a lens holder, wherein the lens holder is suitable and configured to hold at least the third lens, wherein the lighting device comprises a holding means, wherein the holding means is configured to hold the first lens and the second lens;

wherein the holding means has first recesses for fastening the first lens on a side of the holding means facing away from the imaging component; and wherein the holding means has second recesses for fastening the second lens on a side of the holding means facing the imaging component.

2. The lighting device of claim 1, wherein the imaging component is a solid-state LED array.

3. The lighting device of claim 1, wherein the holding means is a one-piece component and is cup-shaped.

4. The lighting device of claim 1, wherein the holding means is disposed between the first lens and the second lens.

5. The lighting device of claim 1, wherein the holding means is configured as an aperture diaphragm, wherein the aperture diaphragm is configured to limit light projected by the projection optics toward the exterior of the motor vehicle.

6. The lighting device of claim 1, wherein the third lens is configured to produce light with an approximately parallel beam path, such that the third lens is configured as a collimator.

7. The lighting device of claim 1, further including a heat sink arranged on the imaging component.

8. The lighting device of claim 1, wherein the holding means includes positioning elements for fastening a diaphragm.

9. The lighting device of claim 1, wherein the holding means is a plastic injection-molded component formed of a thermoset or thermoplastic material.

10. A motor vehicle comprising the lighting device of claim 1.

* * * * *